(12) United States Patent
Yu et al.

(10) Patent No.: US 11,198,621 B2
(45) Date of Patent: Dec. 14, 2021

(54) LITHIUM-RICH LAYERED OXIDE MATERIAL WITH PHASE STRUCTURE GRADIENT AND ITS PREPARATION METHOD

(71) Applicant: Beijing University of Technology, Beijing (CN)

(72) Inventors: Haijun Yu, Beijing (CN); Guangyin Li, Beijing (CN); Tianhao Wu, Beijing (CN); Errui Wang, Beijing (CN); Lin Wang, Beijing (CN); Qi Zhang, Beijing (CN)

(73) Assignee: Beijing University of Technology, Beijing (CN)

( * ) Notice: Subject to any disclaimer, the term of this patent is extended or adjusted under 35 U.S.C. 154(b) by 475 days.

(21) Appl. No.: 16/313,150

(22) PCT Filed: Dec. 22, 2017

(86) PCT No.: PCT/CN2017/117949
§ 371 (c)(1),
(2) Date: Dec. 25, 2018

(87) PCT Pub. No.: WO2019/075910
PCT Pub. Date: Apr. 25, 2019

(65) Prior Publication Data
US 2021/0221702 A1     Jul. 22, 2021

(30) Foreign Application Priority Data

Oct. 20, 2017 (CN) .......................... 201710987132.1

(51) Int. Cl.
*C01G 53/00* (2006.01)
*C01F 5/00* (2006.01)
*H01M 10/0525* (2010.01)

(52) U.S. Cl.
CPC ................ *C01G 53/50* (2013.01); *C01F 5/00* (2013.01); *H01M 10/0525* (2013.01); *C01P 2004/32* (2013.01)

(58) Field of Classification Search
CPC ...... H01M 4/131; H01M 4/366; H01M 4/505; H01M 4/525; H01M 10/0525;
(Continued)

(56) References Cited

FOREIGN PATENT DOCUMENTS

| CN | 102751480 A | 10/2012 |
| CN | 102891309 | * 1/2013 |

(Continued)

OTHER PUBLICATIONS

English translation of CN Publication 102891309, Jan. 2013.*

*Primary Examiner* — Brittany L Raymond
(74) *Attorney, Agent, or Firm* — Leonid Kisselev

(57) ABSTRACT

A lithium-rich layered oxide material with a phase structure gradient and method for making the same are disclosed, used as cathode material for lithium ion battery. The invention has the following technical features: the spherical granule-shaped lithium-rich layered oxide material contains two types of structural units whose ratio gradually changes from the center to the surface of the spherical granule, wherein the monoclinic $Li_2MnO_3$ structural unit is gradually reduced, and the rhombohedral $LiTMO_2$ structural unit is gradually increased from the center to the surface of the spherical granule. By controlling the ratio of the monoclinic $Li_2MnO_3$ structural unit versus the rhombohedral $LiTMO_2$ structural unit along from the center to the surface the spherical granule, the performance of the Lithium-rich layered oxide materials as cathode for lithium ion battery, such as cyclic stability, specific discharge capacity, safety and other properties, is improved. The preparation process is simple and easy to control, the cost of raw materials is low and the (Continued)

environment is friendly. It can be industrialized on a large scale and has a good prospect of application.

8 Claims, 4 Drawing Sheets

(58) Field of Classification Search
CPC .. C01G 45/125; C01G 45/1257; C01G 51/50; C01G 53/50; C01P 2004/32
See application file for complete search history.

(56) References Cited

FOREIGN PATENT DOCUMENTS

| | | | |
|---|---|---|---|
| CN | 102891309 | A | 1/2013 |
| CN | 107221645 | A | 9/2017 |
| JP | 1129329 | A | 2/1999 |
| JP | 2009272940 | A | 11/2009 |

* cited by examiner

1. $0.5Li_2MnO_3 \cdot 0.5Li(Ni_{0.42}Mn_{0.42}Co_{0.16})O_2$
2. $0.4Li_2MnO_3 \cdot 0.6Li(Ni_{0.42}Mn_{0.42}Co_{0.16})O_2$
3. $0.3Li_2MnO_3 \cdot 0.7Li(Ni_{0.42}Mn_{0.42}Co_{0.16})O_2$ LITHIUM-RICH LAYERED OXIDE MATERIAL WITH PHASE STRUCTURE GRADIENT AND ITS PREPARATION METHOD

CROSS REFERENCE TO RELATED APPLICATION

This application is a national stage application of International application number PCT/CN2017/117949, filed Dec. 22, 2017, titled "A Lithium-Rich layered oxide material with Phase structure gradient and its preparation method", which claims the priority benefit of Chinese Patent Application No. 201710987132.1, filed on Oct. 20, 2017, which is hereby incorporated by reference in its entirety.

TECHNICAL FIELD

The invention relates to a lithium rich layered oxide material with phase structure gradient and a preparation method, belonging to the field of cathode material and electrochemistry of lithium ion battery.

BACKGROUND

The next generation of power lithium-ion batteries is used for electric vehicles and power grid storage. How to further increase energy density is the key factor in building better lithium-ion power batteries after satisfying basic requirements for safety, environmental friendliness, cost, and longevity. The energy density of a battery depends mainly on the energy density of the electrode material, therefore, it is necessary to significantly improve the energy density of the electrode materials in order to increase energy density of batteries. There are two ways to increase the energy density of electrode materials: one is to increase the specific capacity of materials, that is, the electric energy storage capacity per unit weight or per unit volume of materials; the other is to increase the working voltage of the electrode. Due to the lack of suitable high voltage electrolyte, the research on cathode materials of lithium-ion batteries focuses on the improvement of the specific capacity.

The current development of lithium ion batteries cathode material mainly includes layered lithium cobalt oxide (LiCoO$_2$), lithium nickelate oxide (LiNiO$_2$), lithium manganate oxide (LiMnO$_2$), spinel structure lithium manganate oxide (LiMn$_2$O$_4$), olivine lithium iron phosphate (LiFePO$_4$), lithium nickel cobalt oxide (LiNi$_x$Co$_y$O$_2$) and lithium nickel cobalt manganate oxide (LiNi$_x$Co$_y$Mn$_z$O$_2$). The specific capacities of these layered oxides materials are all below 200 mAh/g. Compared with the carbon anode material whose specific capacity is reliably over 350 mAh/g, the low capacity of the cathode materials have become the bottleneck impeding the improvement of the energy density of lithium-ion batteries.

The Lithium-rich Manganese-based cathode material xLi$_2$MnO$_3$.(1−x)LiTMO$_2$ (M=Ni, Co, Mn) has high specific discharge capacity (300 mAh/g) at room temperature; and when the temperature rises to 55° C., the specific discharge capacity reaches 350 mAh/g, the average discharge voltage platform is 3.5-3.7V, thus the energy density can reach 1000 Wh/Kg, almost twice the energy density of existing cathode materials. Moreover, a large amount of Mn element is included in this material, which is characterized by low cost and low pollution, making it attractive for applications in electric vehicles and large energy storage. At present, it is one of the most important cathode materials that may improve the energy density and reduce the cost of lithium-ion batteries and has potential to be the first choice of cathode material for the next generation lithium-ion batteries cathode materials. The Lithium-rich Manganese-based cathode material is a composite material composing of Li$_2$MnO$_3$ and LiTMO$_2$ in certain proportion, wherein Li$_2$MnO$_3$ plays important roles of not only stabilizing the material structure, but also providing extra capacity at high voltage.

SUMMARY

The present disclosure relates to a lithium-rich layered oxide material with gradient progression of phase structure and the method of making the same.

The technical scheme of the invention is as follows: a lithium-rich layered oxide material with phase structure gradient comprising: spherical granules comprising material represented by xLi$_2$MnO$_3$.(1−x)LiTMO$_2$ (at the core of the spherical granules)-yLi$_2$MnO$_3$.(1−y)LiTMO$_2$ (at the surface of the spherical granules), where the TM is a combination of Ni, Co, and Mn in different molar ratios, wherein 0<y<x<1, wherein the monoclinic Li$_2$MnO$_3$ structural unit is gradually reduced from the center of the spherical granules to the surface of the spherical granules, and the rhombohedral LiTMO$_2$ structure unit is gradually increased.

The lithium-rich layered oxide material with a phase structure gradient as described above are made into cathode materials for lithium-ion batteries with a high discharge capacity greater than 250 mA/g at 25° C.

A method for making a lithium-rich layered oxide material with a phase structure gradient is disclosed, the method being a coprecipitation-solid phase synthesis method that includes the following steps.

(1) preparing a solution A and a solution B from a nickel salt, a cobalt salt and a manganese salt, wherein the total metal concentration of the solution A and the solution B is 0.2~4 mol/L; wherein the molar ratio of nickel, cobalt, and manganese in the solution A is: 0.05~0.3:0.05~0.2:0.5~0.9, wherein the molar ratio of nickel, cobalt, and manganese in the solution B is: 0.05~0.3:0.05~0.2:0.5~0.9; wherein the molar percentage of manganese in the solution B to nickel, cobalt and manganese is less than the molar percentage of manganese in solution A to nickel, cobalt and manganese.

(2) preparing a 0.1~6 mol/L alkali solution;

(3) preparing a 0.1~6 mol/L complexing agent solution;

(4) using a coprecipitation method, comprising the steps of: adding solution B to a solution B container, adding solution A to a solution A container, gradually adding the solution B to the solution A container through a constant flow pump with stirring, meanwhile, the mixed solution in the solution A container is added to a reactor through a constant flow pump, thereby the molar percentage concentration of Mn in the mixed solution added to the reactor gradually decrease with the increase of dropping time, whereas the molar percentage concentrations of nickel and cobalt increase gradually; meanwhile, the alkali solution in step (2) and the complexing agent solution in step (3) are gradually combined and added into the reactor, controlling the stirring speed in the reactor at 500~1500 RPM with the protection of inert gas at 40~70° C., keeping pH value between 7.0-12.0, to generate a precursor of the lithium-rich layered oxide material with a gradual concentration gradient progression between two structural units by the simultaneous precipitation of multiple elements;

(5) the precursor obtained by step (4) is filtered, washed, dried, and mixed with lithium source compounds, wherein the molar ratio of the lithium versus the Ni, Mn, and Co is n:1, with 1<n≤5;

(6) in an air atmosphere, the mixture obtained in step (5) is pre-sintered at 400~700° C. for 4~10 hours, heated at 600~1000° C. for 6~24 hours, and cooled to room temperature naturally, to obtain the lithium-rich layered oxide material with phase structure gradient.

The manganese salt in the step (1) is one or more of the manganese nitrate, manganese acetate, manganese chloride, and manganese sulfate; wherein the cobalt salt is one or more of the cobalt nitrate, cobalt acetate, cobalt chloride, and cobalt sulfate; wherein the nickel salt is one or more of the nickel nitrate, nickel acetate, nickel chloride, and nickel sulfate.

The alkali solution in step (2) is one or more of the sodium bicarbonate, sodium bicarbonate, ammonium bicarbonate, and ammonium carbonate; or one or more of the sodium hydroxide, potassium hydroxide, and lithium hydroxide.

The complexing agent solution in step (3) is one or more of the citric acid, oxalic acid, ammonia, and EDTA.

The co-precipitation method from step (4) is carbonate co-precipitation method or hydroxide co-precipitation method, wherein the inert gas is nitrogen, argon, or carbon dioxide.

The lithium source in step (5) is one or more of the lithium hydroxide, lithium carbonate, lithium oxalate, and lithium acetate.

The invention has the following technical effects: A lithium-rich layered oxide material with a phase structure gradient is synthesized by a coprecipitation-solid state synthesis method. The lithium-rich layered oxide material is spherical granule-shaped, and contains two types of structural units whose ratio gradually changes from the center to the surface of the spherical granule, i.e., the monoclinic $Li_2MnO_3$ structural unit is gradually reduced, and the rhombohedral $LiTMO_2$ structural unit is gradually increased from the center to the surface of the spherical granule. By controlling the ratio of the monoclinic $Li_2MnO_3$ structural unit versus the rhombohedral $LiTMO_2$ structural unit along from the center to the surface the spherical granule, the performance of the Lithium-rich layered oxide cathode materials for lithium-ion batteries, as measured by cyclic stability, specific discharge capacity, safety and other properties, is improved. The preparation process is simple and easy to control, the cost of raw materials is low and the environment is friendly. It can be industrialized on a large scale and has a good prospect of application.

DETAILED DESCRIPTION OF THE PREFERRED EMBODIMENTS

Figure 1:
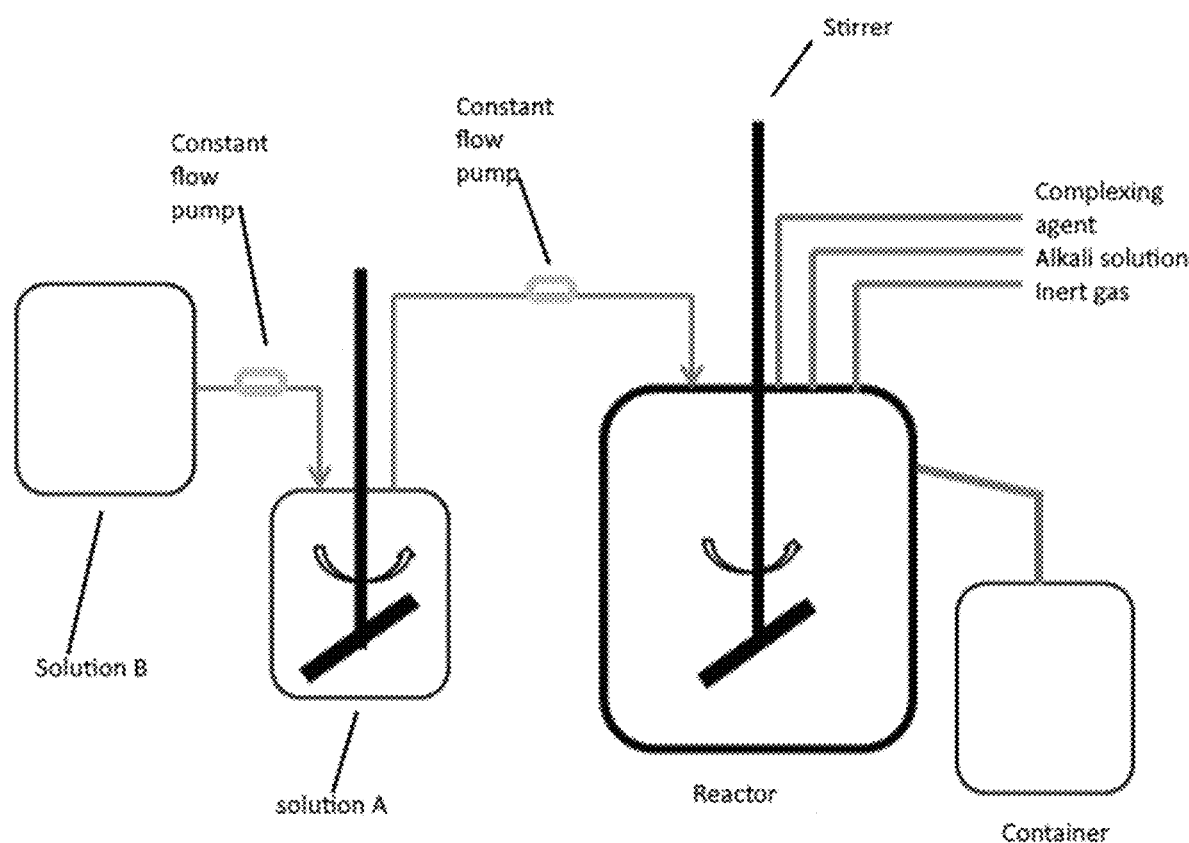
FIG. 1 is a schematic diagram showing a system for making the lithium-rich layered oxide with a phase structure gradient according to an embodiment.
Figure 2:
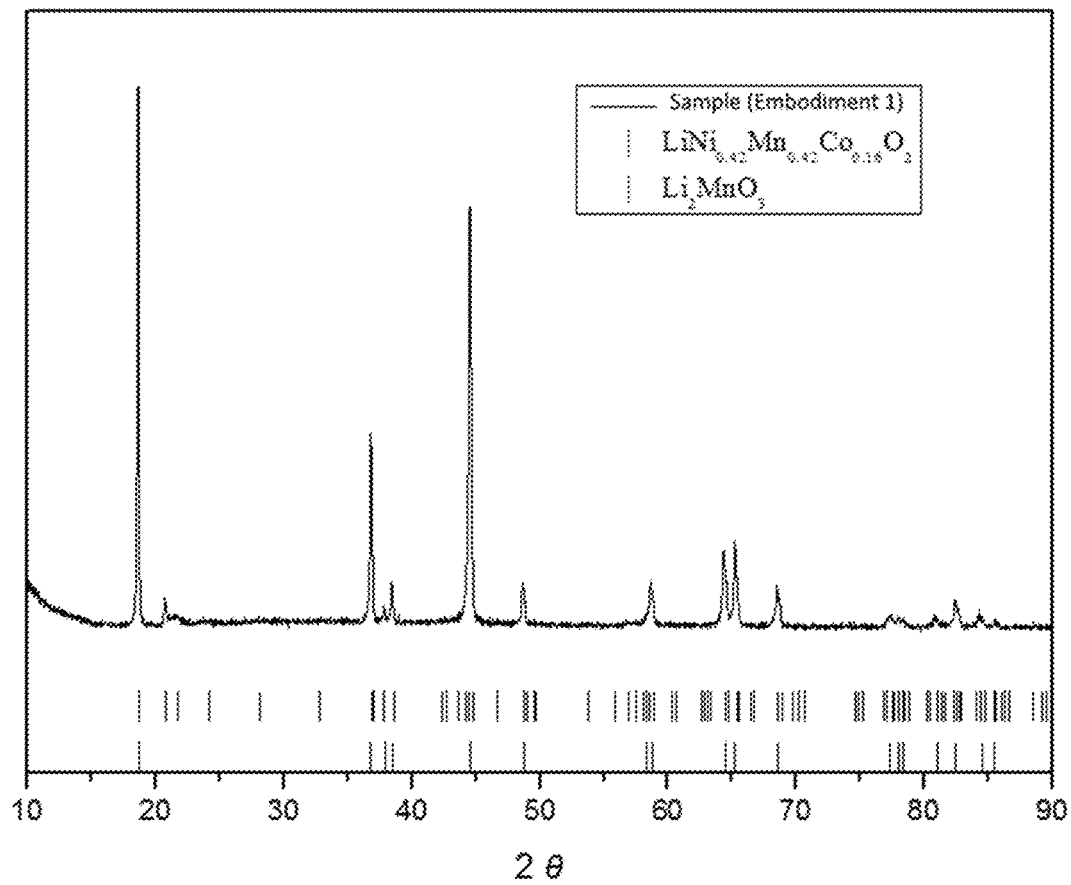
FIG. 2 is an XRD diffraction pattern of a lithium-rich layered oxide with phase structure gradient in embodiment 1.
Figure 3:
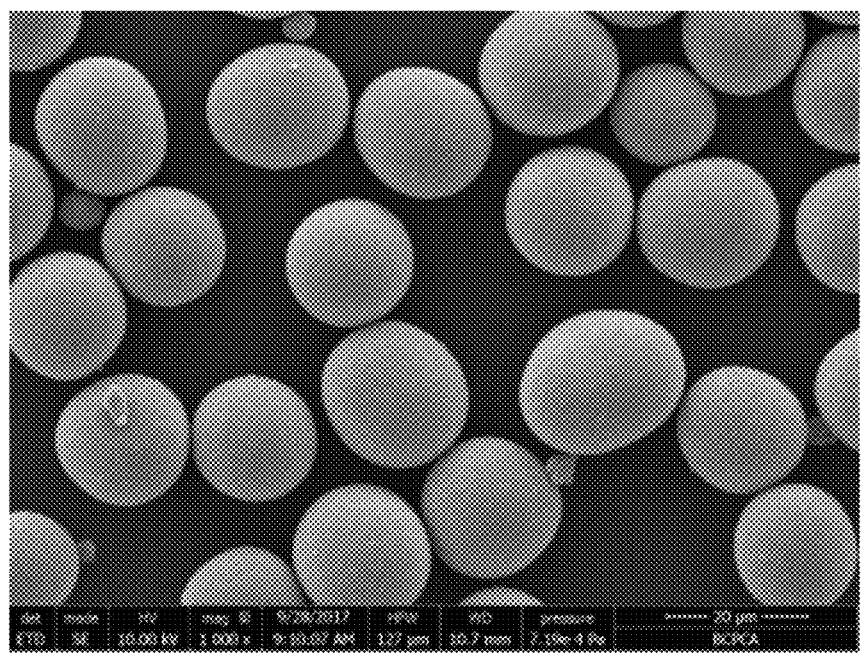
FIG. 3 is a Scanning Electronic Microscope (SEM) image of a lithium-rich layered oxide with phase structure gradient in embodiment 1.
Figure 4:
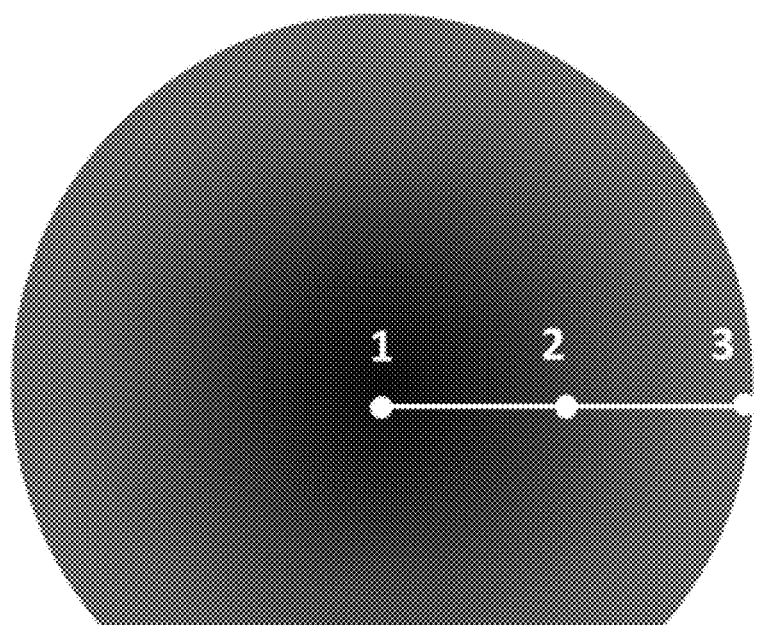
FIG. 4 is diagram of the phase structure gradient of a lithium-rich layered oxide with phase structure gradient in embodiment 1.
Figure 5:
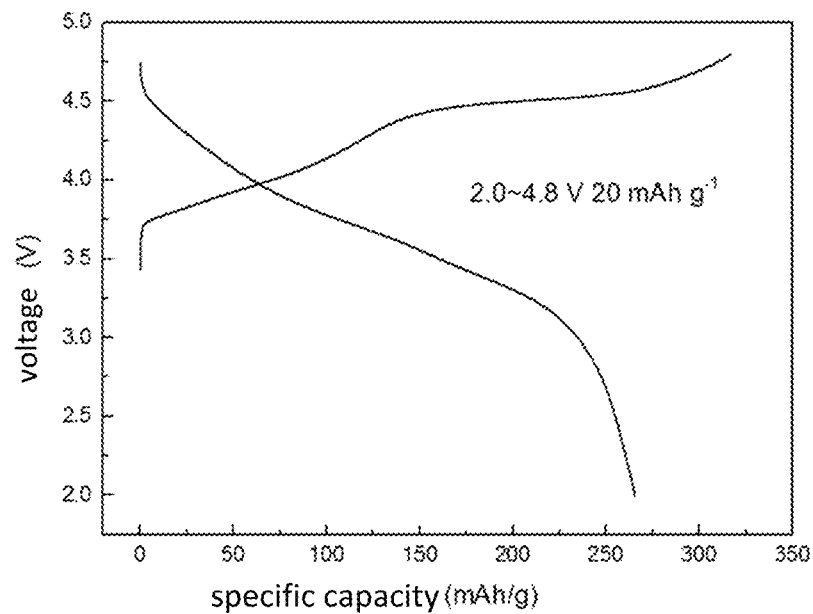
FIG. 5 is a charging and discharging curve of a lithium-rich layered oxide with phase structure gradient in embodiment 1.
Figure 6:
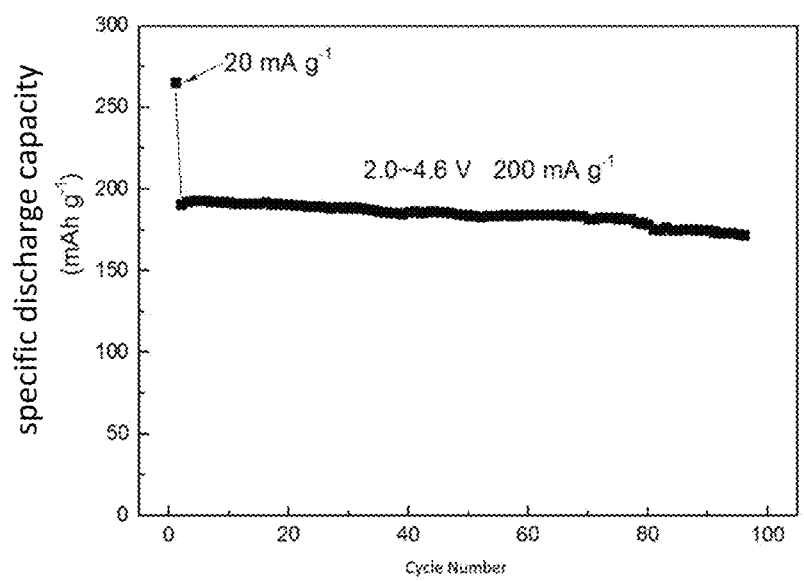
FIG. 6 is a cycle performance curve of a lithium-rich layered oxide with phase structure gradient in embodiment 1.

The working principle and testing method of the testing device are further described in the following detailed description of embodiments of the invention. Reference is made to the accompanying drawings in which like references indicates similar elements, and in which is shown by way of illustration, specific embodiments in which the invention may be practiced. These embodiments are described in sufficient detail to enable those skilled in the art to practice the invention. In other instances, well-known circuits, structures, and techniques have not been shown in detail in order not to obscure the understanding of this description. The following detailed description is, therefore, not to be taken in a limiting sense, and the scoop of the invention is defined only by the appended claims.

Embodiment 1

(1) Nickel sulfate ($NiSO_4.6H_2O$), cobalt sulfate ($NiSO_4.7H_2O$) and manganese sulfate ($MnSO_4.H_2O$) were dissolved in deionized water, and 2 mol/L solution A and solution B were prepared respectively. In solution A, Ni:Co:Mn (molar ratio)=0.21:0.08:0.71; in solution B, Ni:Co:Mn (molar ratio)=0.343:0.1305:0.5265. 2 mol/L $Na_2CO_3$ solution and 0.2 mol/L ammonia were also prepared.

(2) The solution B (600 mL) prepared in step (1) was added to the solution A (600 mL) through a constant flow pump while stirring; meanwhile, the mixed solution of A and B was added to a reactor through a constant flow pump, the $Na_2CO_3$ solution and the ammonia solution are added to the reactor by concurrently flowing through a constant flow pump. The stirring speed was controlled at 1000 RPM and the reaction temperature was 55° C., pH was 8.1, reaction time was 10 hours, a precursor of lithium-rich layered oxide with phase structure gradient was obtained by coprecipitation reaction.

(3) The precursor obtained in step (2) was filtered, washed, dried, and mixed with $Li_2CO_3$ with the ratio of lithium to combined Ni, Mn and Co being 1.6:1. Pre-sintering at 500° C. for 5 hours under air atmosphere, heating up to 900° C. and maintained for 10 hours, a lithium-rich layered oxide material with phase structure gradient was obtained, with the center of spherical granule being represented by $0.5Li_2MnO_3.0.5Li(Ni_{0.42}Mn_{0.42}Co_{0.16})O_2$, and the surface of the spherical granule being represented by $0.3Li_2MnO_3.0.7Li(Ni_{0.42}Mn_{0.42}Co_{0.16})O_2$.

The above prepared material was mixed with acetylene black and PTFE (aqueous solution) in proportion of 80:15:5 and rolled into film. The film was sliced and pressed onto an aluminum web, assembled into a 2032 button battery and tested for electrochemical performance.

Embodiment 2

(1) Nickel sulfate ($NiSO_4.6H_2O$), cobalt sulfate ($NiSO_4.7H_2O$) and manganese sulfate ($MnSO_4.H_2O$) were dissolved in deionized water, and 2 mol/L solution A and solution B were prepared respectively. In solution A, Ni:Co:Mn (molar ratio)=0.21:0.08:0.71; in solution B, Ni:Co:Mn (molar ratio)=0.2765:0.1055:0.618. 2 mol/L $Na_2CO_3$ solution and 0.2 mol/L ammonia solution were also prepared.

(2) The solution B (600 mL) prepared in step (1) was added to the solution A (600 mL) through a constant flow pump while stirring; meanwhile, the mixed solution of A and B was added to a reactor through a constant flow pump, the $Na_2CO_3$ solution and the ammonia solution are added to the reactor by concurrently flowing through a constant flow pump. The stirring speed was controlled at 1000 RPM and the reaction temperature was 55° C., pH was 7.6, reaction time was 18 hours, a precursor of lithium-rich layered oxide with phase structure gradient was obtained by co-precipitation reaction.

(3) The precursor obtained in step (2) was filtered, washed, dried, and mixed with $Li_2CO_3$ with the ratio of lithium to combined Ni, Mn and Co being 1.6:1. Pre-sintering at 500° C. for 5 hours under air atmosphere, heating up to 900° C. and maintained for 10 hours, a lithium-rich layered oxide material with phase structure gradient was obtained, with the center of spherical granules being represented by $0.5Li_2MnO_3 \cdot 0.5Li(Ni_{0.42}Mn_{0.42}Co_{0.16})O_2$, and the surface of the spherical granules being represented by $0.4Li_2MnO_3 \cdot 0.6Li(Ni_{0.42}Mn_{0.42}Co_{0.16})O_2$.

The above prepared material was mixed with acetylene black and PTFE (aqueous solution) in proportion of 80:15:5 and rolled into film. The film was sliced and pressed onto an aluminum web, assembled into a 2032 button battery and tested for electrochemical performance.

Embodiment 3

(10 Nickel sulfate ($NiSO_4 \cdot 6H_2O$), cobalt sulfate ($NiSO_4 \cdot 7H_2O$) and manganese sulfate ($MnSO_4 \cdot H_2O$) were dissolved in deionized water. 2 mol/L solution A and solution B were prepared respectively. In solution A, Ni:Co:Mn (molar ratio)=0.21:0.08:0.71; in solution B, Ni:Co:Mn (molar ratio)=0.409:0.156:0.435. 2 mol/L $Na_2CO_3$ solution and 0.2 mol/L ammonia were also prepared.

(2) The solution B (600 mL) prepared in step (1) was added to the solution A (600 mL) through a constant flow pump while stirring; meanwhile, the mixed solution of A and B was added to a reactor through a constant flow pump, the $Na_2CO_3$ solution and the ammonia solution are added to the reactor by concurrently flowing through a constant flow pump. The stirring speed was controlled at 1000 RPM and the reaction temperature was 55° C., pH was 7.8, reaction time was 40 hours, a precursor of lithium-rich layered oxide with phase structure gradient was obtained by coprecipitation reaction.

(3) The precursor obtained in step (2) was filtered, washed, dried, and mixed with $Li_2CO_3$ with the ratio of lithium to combined Ni, Mn and Co being 1.7:1. Pre-sintering at 500° C. for 5 hours under air atmosphere, heating up to 900° C. and maintained for 10 hours, a lithium-rich layered oxide material with phase structure gradient was obtained, with the center of spherical granules being represented by $0.5Li_2MnO_3 \cdot 0.5Li(Ni_{0.42}Mn_{0.42}Co_{0.16})O_2$, and the surface of the spherical granules being represented by $0.2Li_2MnO_3 \cdot 0.8Li(Ni_{0.42}Mn_{0.42}Co_{0.16})O_2$.

The above prepared material was mixed with acetylene black and PTFE (aqueous solution) in proportion of 80:15:5 and rolled into film. The film was sliced and pressed onto an aluminum web, assembled into a 2032 button battery and tested for electrochemical performance.

Embodiment 4

(1) Nickel sulfate ($NiSO_4 \cdot 6H_2O$), cobalt sulfate ($NiSO_4 \cdot 7H_2O$) and manganese sulfate ($MnSO_4 \cdot H_2O$) were dissolved in deionized water. 2 mol/L solution A and solution B were prepared respectively. In solution A, Ni:Co:Mn (molar ratio)=0.21:0.08:0.71; in solution B, Ni:Co:Mn (molar ratio)=0.4755:0.1815:0.343. 2 mol/L $Na_2CO_3$ solution and 0.2 mol/L ammonia solution were also prepared.

(2) The solution B (600 mL) prepared in step (1) was added to the solution A (600 mL) through a constant flow pump while stirring; meanwhile, the mixed solution of A and B was added to a reactor through a constant flow pump, the $Na_2CO_3$ solution and the ammonia solution are added to the reactor by concurrently flowing through a constant flow pump. The stirring speed was controlled at 1000 RPM and the reaction temperature was 55° C., pH was 7.8, reaction time was 25 hours, a precursor of lithium-rich layered oxide with phase structure gradient was obtained by coprecipitation reaction.

(3) The precursor obtained in step (2) was filtered, washed, dried, and mixed with $Li_2CO_3$ with the ratio of lithium to combined Ni, Mn and Co being 1.7:1. Pre-sintering at 500° C. for 5 hours under air atmosphere, heating up to 900° C. and maintained for 10 hours, a lithium-rich layered oxide material with phase structure gradient was obtained, with the center of spherical granules being represented by $0.5Li_2MnO_3 \cdot 0.5Li(Ni_{0.42}Mn_{0.42}Co_{0.16})O_2$, and the surface of the spherical granules being represented by $0.1Li_2MnO_3 \cdot 0.9Li(Ni_{0.42}Mn_{0.42}Co_{0.16})O_2$.

The above prepared material was mixed with acetylene black and PTFE (aqueous solution) in proportion of 80:15:5 and rolled into film. The film was sliced and pressed onto an aluminum web, assembled into a 2032 button battery and tested for electrochemical performance.

Embodiment 5

(1) Nickel sulfate ($NiSO_4 \cdot 6H_2O$), cobalt sulfate ($NiSO_4 \cdot 7H_2O$) and manganese sulfate ($MnSO_4 \cdot H_2O$) were dissolved in deionized water. 3 mol/L solution A and solution B were prepared respectively. In solution A, Ni:Co:Mn (molar ratio)=0.21:0.08:0.71, In solution B, Ni:Co:Mn (molar ratio)=0.4755:0.1815:0.343. 3 mol/L $Na_2CO_3$ solution and 0.5 mol/L ammonia solution were also prepared.

(2) The solution B (600 mL) prepared in step (1) was added to the solution A (600 mL) through a constant flow pump while stirring; meanwhile, the mixed solution of A and B was added to a reactor through a constant flow pump, the $Na_2CO_3$ solution and the ammonia solution are added to the reactor by concurrently flowing through a constant flow pump. The stirring speed was controlled at 1000 RPM and the reaction temperature was 55° C., pH was 9.0, reaction time was 15 hours, a precursor of lithium-rich layered oxide with phase structure gradient was obtained by coprecipitation reaction.

(3) The precursor obtained in step (2) was filtered, washed, dried, and mixed with $Li_2CO_3$ with the ratio of lithium to combined Ni, Mn and Co being 1.6:1. Pre-sintering at 500° C. for 5 hours under air atmosphere, heating up to 900° C. and maintained for 12 hours, a lithium-rich layered oxide material with phase structure gradient was obtained, with the center of spherical granules being represented by $0.5Li_2MnO_3 \cdot 0.5Li(Ni_{0.42}Mn_{0.42}Co_{0.16})O_2$, and the surface of the spherical granules being represented by $0.1Li_2MnO_3 \cdot 0.9Li(Ni_{0.42}Mn_{0.42}Co_{0.16})O_2$.

The above prepared material was mixed with acetylene black and PTFE (aqueous solution) in proportion of 80:15:5 and rolled into film. The film was sliced and pressed onto an aluminum web, assembled into a 2032 button battery and tested for electrochemical performance.

Embodiment 6

Nickel sulfate ($NiSO_4 \cdot 6H_2O$), cobalt sulfate ($NiSO_4 \cdot 7H_2O$) and manganese sulfate ($MnSO_4 \cdot H_2O$) were dissolved in deionized water. 1.5 mol/L solution A and solution B were prepared respectively. In solution A, Ni:Co:Mn (molar ratio)=0.21:0.08:0.71, In solution B, Ni:Co:Mn (molar ratio)=0.409:0.156:0.435. 1.5 mol/L $Na_2CO_3$ solution and 0.1 mol/L ammonia solution were also prepared.

(2) The solution B (600 mL) prepared in step (1) was added to the solution A (600 mL) through a constant flow pump while stirring; meanwhile, the mixed solution of A and B was added to a reactor through a constant flow pump, the $Na_2CO_3$ solution and the ammonia solution are added to the reactor by concurrently flowing through a constant flow pump. The stirring speed was controlled at 900 RPM and the reaction temperature was 55° C., pH was 8.2, reaction time was 25 hours, a precursor of lithium-rich layered oxide with phase structure gradient was obtained by coprecipitation reaction.

(3) The precursor obtained in step (2) was filtered, washed, dried, and mixed with $Li_2CO_3$ with the ratio of lithium to combined Ni, Mn and Co being 1.6:1. Pre-sintering at 500° C. for 5 hours under air atmosphere, heating up to 950° C. and maintained for 12 hours, a lithium-rich layered oxide material with phase structure gradient was obtained, with the center of spherical granules being represented by $0.5Li_2MnO_3 \cdot 0.5Li(Ni_{0.42}Mn_{0.42}Co_{0.16})O_2$, and the surface of the spherical granules being represented by $0.2Li_2MnO_3 \cdot 0.81Li(Ni_{0.42}Mn_{0.42}Co_{0.16})O_2$.

The above prepared material was mixed with acetylene black and PTFE (aqueous solution) in proportion of 80:15:5 and rolled into film. The film was sliced and pressed onto an aluminum web, assembled into a 2032 button battery and tested for electrochemical performance.

Embodiment 7

(1) Nickel sulfate ($NiSO_4 \cdot 6H_2O$), cobalt sulfate ($NiSO_4 \cdot 7H_2O$) and manganese sulfate ($MnSO_4 \cdot H_2O$) were dissolved in deionized water. 2 mol/L solution A and solution B were prepared respectively. In solution A, Ni:Co:Mn (molar ratio)=0.21:0.08:0.71; in solution B, Ni:Co:Mn (molar ratio)=0.343:0.1305:0.5265. 2.5 mol/L $Na_2CO_3$ solution and 0.3 mol/L ammonia solution were also prepared.

(2) The solution B (600 mL) prepared in step (1) was added to the solution A (600 mL) through a constant flow pump while stirring; meanwhile, the mixed solution of A and B was added to a reactor through a constant flow pump, the $Na_2CO_3$ solution and the ammonia solution are added to the reactor by concurrently flowing through a constant flow pump. The stirring speed was controlled at 1200 RPM and the reaction temperature was 60° C., pH was 8.2, reaction time was 30 hours, a precursor of lithium-rich layered oxide with phase structure gradient was obtained by coprecipitation reaction.

(3) The precursor obtained in step (2) was filtered, washed, dried, and mixed with $Li_2CO_3$ with the ratio of lithium to combined Ni, Mn and Co being 1.6:1. Pre-sintering at 500° C. for 5 hours under air atmosphere, heating up to 900° C. and maintained for 10 hours, a lithium-rich layered oxide material with phase structure gradient was obtained, with the center of spherical granules being represented by $0.5Li_2MnO_3 \cdot 0.5Li(Ni_{0.42}Mn_{0.42}Co_{0.16})O_2$, and the surface of the spherical granules being represented by $0.3Li_2MnO_3 \cdot 0.7Li(Ni_{0.42}Mn_{0.42}Co_{0.16})O_2$.

The above prepared material was mixed with acetylene black and PTFE (aqueous solution) in proportion of 80:15:5 and rolled into film. The film was sliced and pressed onto an aluminum web, assembled into a 2032 button battery and tested for electrochemical performance.

Embodiment 8

(1) Nickel sulfate ($NiSO_4 \cdot 6H_2O$), cobalt sulfate ($NiSO_4 \cdot 7H_2O$) and manganese sulfate ($MnSO_4 \cdot H_2O$) were dissolved in deionized water. 2 mol/L solution A and solution B were prepared respectively. In solution A, Ni:Co:Mn (molar ratio)=0.21:0.08:0.71, In solution B, Ni:Co:Mn (molar ratio)=0.409:0.156:0.435. 2 mol/L $Na_2CO_3$ solution and 0.6 mol/L ammonia solution were also prepared.

(2) The solution B (600 mL) prepared in step (1) was added to the solution A (600 mL) through a constant flow pump while stirring; meanwhile, the mixed solution of A and B was added to a reactor through a constant flow pump, the $Na_2CO_3$ solution and the ammonia solution are added to the reactor by concurrently flowing through a constant flow pump. The stirring speed was controlled at 1100 RPM and the reaction temperature was 55° C., pH was 8.0, reaction time was 35 hours, a precursor of lithium-rich layered oxide with phase structure gradient was obtained by coprecipitation reaction.

(3) The precursor obtained in step (2) was filtered, washed, dried, and mixed with $Li_2CO_3$ with the ratio of lithium to combined Ni, Mn and Co being 1.8:1. Pre-sintering at 500° C. for 5 hours under air atmosphere, heating up to 900° C. and maintained for 10 hours, a lithium-rich layered oxide material with phase structure gradient was obtained, with the center of spherical granules being represented by $0.5Li_2MnO_3 \cdot 0.5Li(Ni_{0.42}Mn_{0.42}Co_{0.16})O_2$, and the surface of the spherical granules being represented by $0.2Li_2MnO_3 \cdot 0.8Li(Ni_{0.42}Mn_{0.42}Co_{0.16})O_2$.

The above prepared material was mixed with acetylene black and PTFE (aqueous solution) in proportion of 80:15:5 and rolled into film. The film was sliced and pressed onto an aluminum web, assembled into a 2032 button battery and tested for electrochemical performance.

What is claimed is:
1. A lithium-rich layered oxide material with a phase structure gradient, comprising:
spherical granules comprising material represented by $xLi_2MnO_3(1-x)LiTMO_2$ (at the core of the spherical granules)-$yLi_2MnO_3 (1-y)LiTMO_2$ (at the surface of the spherical granules), where the TM is a combination of Ni, Co, and Mn in different molar ratios from one another, wherein $0<y<x<1$, wherein a concentration of the monoclinic $Li_2MnO_3$ structural unit is gradually reduced from the center of the spherical granules to the surface of the spherical granules, and a concentration of the rhombic $LiTMO_2$ structure unit is gradually increased from the center of the spherical granules to the surface of the spherical granules.

2. A lithium-rich layered oxide material with a phase structure gradient according to claim 1, wherein the lithium-rich layered oxide material is made into a cathode electrode for a lithium-ion battery with a high discharge capacity higher than 250 mAh/g at 25° C.

3. A method for preparing a lithium-rich layered oxide material with a phase structure gradient of claim 1, by a co-precipitation-solid phase synthesis method comprising the steps of:
  (1) preparing each of a solution A and a solution B from a nickel salt, a cobalt salt and a manganese salt, wherein the total metal concentration of each of the solution A and the solution B is 0.2~4 mol/L; wherein the molar ratio of nickel, cobalt, and manganese in the solution A is: 0.05~0.3:0.05~0.2:0.5~0.9; wherein the molar ratio of nickel, cobalt, and manganese in the solution B is: 0.05~0.3:0.05~0.2:0.5~0.9; wherein the molar percentage of manganese in the solution B to nickel, cobalt and manganese is less than the molar percentage of manganese in solution A to nickel, cobalt and manganese;
  (2) preparing a 0.1~6 mol/L alkali solution;
  (3) preparing a 0.1~6 mol/L complexing agent solution;
  (4) using a co-precipitation method, comprising the steps of: adding solution B to a solution B container, adding solution A to a solution A container, gradually adding the solution B to the solution A container through a constant flow pump with stirring to form a mixed solution, and adding the mixed solution in the solution A container to a reactor through a constant flow pump, thereby the molar percentage concentration of Mn in the mixed solution added to the reactor gradually decreases with the increase of dropping time, whereas the molar percentage concentrations of nickel and cobalt increase gradually; gradually combining and adding into the reactor the alkali solution from step (2) and the complexing agent solution from step (3), controlling the stirring speed in the reactor at $500^{\sim 1500}$ RPM with the protection of inert gas at 40~70° C., keeping pH value between 7.0~12.0, to generate a precursor of the lithium-rich layered oxide material with a gradual concentration gradient progression between two structural units by the simultaneous precipitation of multiple elements;
  (5) the precursor obtained in step (4) is filtered, washed, dried, and mixed with lithium source compounds, wherein the molar ratio of the lithium versus the Ni, Mn, and Co is n:1, with 1<n<5; and
  (6) in an air atmosphere, the mixture obtained in step (5) is pre-sintered at 400~700° C. for 4~10 hours, heated at 600~1000° C. for 6~24 hours, and cooled to room temperature naturally, to obtain the lithium-rich layered oxide material with phase structure gradient.

4. The method according to claim 3, wherein the manganese salt in step (1) is one or more of manganese nitrate, manganese acetate, manganese chloride, and manganese sulfate; wherein the cobalt salt is one or more of cobalt nitrate, cobalt acetate, cobalt chloride, and cobalt sulfate;
  wherein the nickel salt is one or more of nickel nitrate, nickel acetate, nickel chloride, and nickel sulfate.

5. The method according to claim 3, wherein the alkali solution in step (2) is one or more of sodium bicarbonate, sodium bicarbonate, ammonium bicarbonate, and ammonium carbonate; or one or more of sodium hydroxide, potassium hydroxide, and lithium hydroxide.

6. The method according to claim 3, wherein the complexing agent solution in step (3) is one or more of citric acid, oxalic acid, ammonia, and EDTA.

7. The method according to claim 3, wherein the co-precipitation method from step (4) is carbonate co-precipitation or hydroxide co-precipitation; wherein the inert gas is nitrogen, argon, or carbon dioxide.

8. The method according to claim 3, wherein the lithium source in step (5) is one or more of lithium hydroxide, lithium carbonate, lithium oxalate, and lithium acetate.

* * * * *